G. Oerllein,

Horse Power.

No 79,852.  Patented July 14, 1868.

Witnesses:  Inventor
George Oerllein

United States Patent Office.

GEORGE OERLLEIN, OF UTICA, MINNESOTA.

Letters Patent No. 79,852, dated July 14, 1868.

---

IMPROVED HORSE-POWER.

---

The Schedule referred to in these Letters Patent and making part of the same.

---

TO ALL WHOM IT MAY CONCERN:

Be it known that I, GEORGE OERLLEIN, of the town of Utica, county of Winona, and State of Minnesota, have invented a new and useful Improvement in Horse-Powers; and I do hereby declare that the following is a full, clear, and exact description thereof, which will enable those skilled in the art to make and use the same, reference being had to the accompanying drawing, forming part of this specification, in which—

Figure 1:
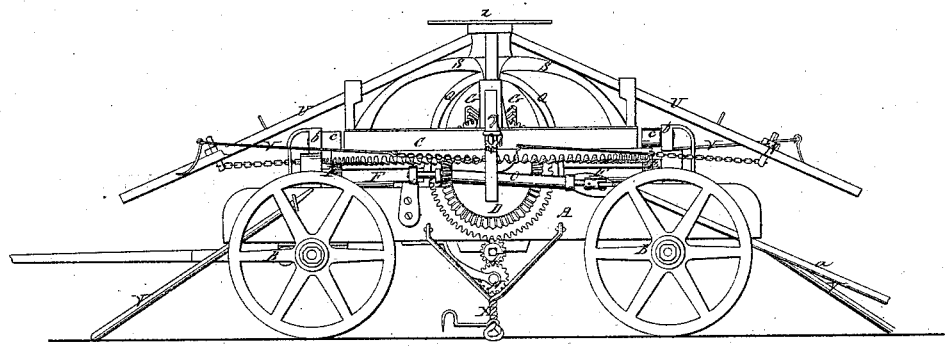
Figure 2:
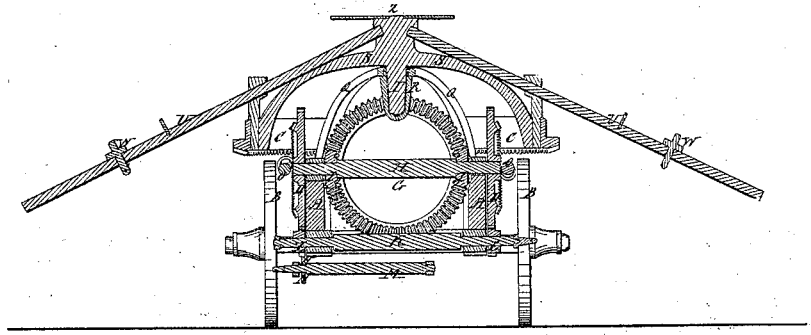

Figure 1 is a longitudinal side view,

Figure 2 a cross sectional view, and

Figure 3:
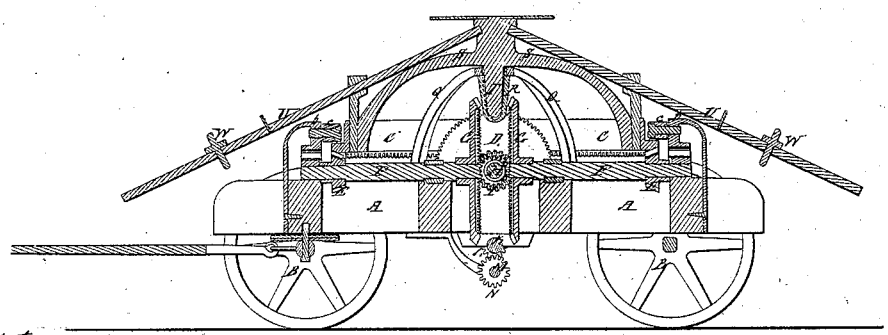

Figure 3 a longitudinal sectional view.

Similar letters of reference in each of the figures indicate corresponding parts.

The object of my invention is to produce a horse-power which can be worked on the wheels which are used for moving it from place to place; also so arranged that power can be taken from both sides and both ends at the same time, or from only one of them, as desired.

A, the frame of the working-gear, supported on wheels; B, the wheels supporting the frame A; C, the master-wheel; D, compound bevel and square-toothed wheel, by which the tumbling-rod shafts are operated, (there are two of these wheels, one on each side of the power;) E E, pinions gearing into the master-wheel; F F, shafts on which are pinions E; G G, bevel-wheels on the inner ends of shafts F F; H, cross-shaft, on the ends of which are wheels D; I I, bevel-pinions on shaft H, gearing into wheels G G; K, tumbling-rod shaft, across under frame A; L L, pinions, one on each end of shaft K, meshing into wheels D D; M, tumbling-rod shaft, under frame A, supported by hangers; N, pinion on the outer end of shaft M, meshing into pinion L on shaft K; O, side tumbling-rod shaft, (there are two of these, one on each side of the power;) P, bevel-pinion on shaft O, meshing into the bevel-gear on wheel D; Q, supporting-frame for the master-wheel C; R, step in the supporting-frame Q; S, arms of the master-wheel C; T, centre-shaft of master-wheel C, fitting into step R; U, draught-levers to the master-wheel: V, rods and chains connecting the outer ends of draught-levers U; W, toothed wheels, shafts, and dogs with which, with a wrench, to tighten chains V; X, side-braces with which to secure frame A to the ground; Y Y, end-braces, to keep frame A from moving endways when the power is in operation; Z, driver's seat. a, section of tumbling-rod; b b, braces on the frame A; c c, hollow rollers, working on shafts screwed into braces b b. These rollers hold the master-wheel from rising out of gear.

Operation: The power being hauled to the spot where wanted, the side-braces X are secured to the ground, and braces Y Y put in place, one end in the staple in the frame A, and the other end in the ground. This will keep the power steady in place. Then connect the machine or machines to the power by the tumbling-rods, hitch the horses to the draught-levers U, and put them in motion. This will revolve master-wheel C, which, gearing into pinions E E, revolves the shaft F, putting wheels G G in motion, which, gearing into pinions I I, revolve shaft H and wheels D, which revolve the tumbling-rod shafts, and by this means machinery is operated. One of the pinions I on shaft H is loose, and revolves on the shaft; the other is keyed to the shaft. Should the fast pinions I get broken, then the other pinion I can be keyed on the shaft, and the power be ready for use without further repairs. The pinions on the tumbling-rod shafts can, any or all of them, be thrown out of gear, so that one alone, or any number of them, can be worked at the same time, the advantage being that power can be taken from either side or from either end of the power. The pinions on the tumbling-rod shafts are held securely by pins, which pins are used to hold the pinions in place when thrown out of gear.

When done using the power, and desiring to move it, the braces X are unloosed from the ground, and hitched up to the sides of the power, and the braces Y Y removed and placed on the frame A; then hitch to the tongue of the frame A, and haul it to any place desired. The power being all the time on the wheels with which it is moved from place to place, it requires but a few minutes to have it ready to use, or to disengage it for removal.

What I claim as my invention, and desire to secure by Letters Patent, is—

1. A horse-power, arranged on wheels, substantially as described.

2. Master-wheel C, supporting-frame Q, step R, arms S, centre-shaft T, and draught-levers U, in combination, substantially as described.

3. Draught-levers U, chains V, toothed wheels, shafts, and dogs, W, in combination with master-wheel C, substantially as described.

4. Tumbling-rod shafts O, M, and K, arranged and combined substantially as described.

5. Wheels D and G and master-wheel C, with their connections, arranged and combined substantially as described.

6. Braces X and Y, in combination with frame A, substantially as and for the purpose described.

GEORGE OERLLEIN.

Witnesses:
FRANCIS BENINGHAUSEN,
PERCY B. SMITH.